United States Patent
Covington et al.

(10) Patent No.: US 8,918,234 B2
(45) Date of Patent: Dec. 23, 2014

(54) LANDING POINT INDICATION SYSTEM

(71) Applicant: Bell Helicopter Textron Inc., Fort Worth, TX (US)

(72) Inventors: Charles E. Covington, Colleyville, TX (US); Bradley Regnier, Fort Worth, TX (US); Robert Worsham, Weatherford, TX (US); Troy S. Caudill, Burleson, TX (US); Thomas E. Archer, II, Keller, TX (US); James M. McCollough, Arlington, TX (US)

(73) Assignee: Bell Helicopter Textron Inc., Forth Worth, TX (US)

( * ) Notice: Subject to any disclaimer, the term of this patent is extended or adjusted under 35 U.S.C. 154(b) by 221 days.

(21) Appl. No.: 13/715,277

(22) Filed: Dec. 14, 2012

(65) Prior Publication Data

US 2014/0081484 A1    Mar. 20, 2014

Related U.S. Application Data (60) Provisional application No. 61/702,057, filed on Sep. 17, 2012.

(51) Int. Cl.
| | |
|---|---|
| G05D 1/00 | (2006.01) |
| G01C 23/00 | (2006.01) |
| G08G 5/02 | (2006.01) |
| B64C 27/04 | (2006.01) |
| B64D 45/08 | (2006.01) |
| B64D 47/08 | (2006.01) |

(52) U.S. Cl.
CPC *G08G 5/02* (2013.01); *G01C 23/00* (2013.01); *B64C 27/04* (2013.01); *B64D 45/08* (2013.01); *B64D 47/08* (2013.01)
USPC .......................................................... 701/3

(58) Field of Classification Search
None
See application file for complete search history.

(56) References Cited

U.S. PATENT DOCUMENTS

| 4,101,893 A | 7/1978 | Lewis |
|---|---|---|
| 4,249,158 A | 2/1981 | Basov |

(Continued)

FOREIGN PATENT DOCUMENTS

| DE | 102007019808 A1 * | 6/2009 |
|---|---|---|
| DE | 102009060901 A1 | 7/2011 |
| EP | 1906151 A2 | 4/2008 |

OTHER PUBLICATIONS

Machine Translation of German Patent Application DE102007019808A1 titled "Landing aid system for vertical takeoff and landing aircraft, especially helicopters" to Thomas Pfenninger, publication date Jun. 18, 2009.*

(Continued)

*Primary Examiner* — John R Olszewski
*Assistant Examiner* — Navid Ziaeianmehdizadeh (57) ABSTRACT

According to one embodiment, a landing point indication system includes an image provider, a rotorcraft position provider, a pilot image generation system, and a display device. The image provider is operable to provide a visual representation of an area underneath a rotorcraft. The rotorcraft position provider is operable to provide information indicating a position of the rotorcraft. The pilot image generation system is operable to generate a supplemented visual representation. The supplemented visual representation includes the visual representation of the area underneath the aircraft and information indicating a position of the rotorcraft relative to the visual representation. The display device is operable to display the supplemented visual representation within the rotorcraft.

20 Claims, 5 Drawing Sheets

(56) References Cited

U.S. PATENT DOCUMENTS

| | | | |
|---|---|---|---|
| 4,368,517 A | 1/1983 | Lovering | |
| 4,414,532 A | 11/1983 | Kaul | |
| 4,667,196 A | 5/1987 | Kaul | |
| 4,868,567 A | 9/1989 | Eichweber | |
| 4,925,303 A | 5/1990 | Pusic | |
| 4,979,154 A | 12/1990 | Brodeur | |
| 5,287,104 A | 2/1994 | Shemwell | |
| 5,661,486 A | 8/1997 | Faivre | |
| 5,666,111 A | 9/1997 | Servat | |
| 5,695,157 A | 12/1997 | Coirier | |
| 6,012,001 A | 1/2000 | Scully | |
| 6,119,055 A | 9/2000 | Richman | |
| 6,731,331 B1 * | 5/2004 | Watabe et al. | 348/144 |
| 7,365,652 B2 | 4/2008 | Scherbarth | |
| 7,672,758 B2 | 3/2010 | Astruc | |
| 7,800,645 B2 * | 9/2010 | Nonoyama et al. | 348/144 |
| 7,852,236 B2 | 12/2010 | Feyereisen | |
| 7,898,435 B2 | 3/2011 | Rogers | |
| 7,952,492 B2 | 5/2011 | Constans | |
| 8,019,490 B2 | 9/2011 | Ferren | |
| 8,112,188 B2 | 2/2012 | Rouquette | |
| 8,138,899 B2 | 3/2012 | Ghneim | |
| 8,209,072 B2 | 6/2012 | Villaume | |
| 8,392,037 B2 * | 3/2013 | Sahasrabudhe et al. | 701/3 |
| 2004/0217883 A1 | 11/2004 | Judge et al. | |
| 2005/0125142 A1 * | 6/2005 | Yamane | 701/200 |
| 2006/0087452 A1 | 4/2006 | Scherbarth | |
| 2009/0138138 A1 * | 5/2009 | Ferren et al. | 701/3 |
| 2012/0004793 A1 | 1/2012 | Block | |
| 2013/0027554 A1 * | 1/2013 | Meadow | 348/144 |

OTHER PUBLICATIONS

Thomas Pfenninger, "Landing Aid System for Vertically Starting and Landing Aircraft, Especially Helicopters", Human Translation of German Patent application DE102007019808 A1.*

European Search Report in related European Application No. 13183615.5, dated Jan. 23, 2013, 3 pages.

Official Action in related European Application No. 13183615.5, dated Mar. 24, 2014, 4 pages.

* cited by examiner

LANDING POINT INDICATION SYSTEM

RELATED APPLICATIONS

Pursuant to 35 U.S.C. §119 (e), this application claims priority to U.S. Provisional Patent Application Ser. No. 61/702,057, entitled LANDING POINT INDICATION SYSTEM, filed Sep. 17, 2012. U.S. Provisional Patent Application Ser. No. 61/702,057 is hereby incorporated by reference.

TECHNICAL FIELD

This invention relates generally to helicopter landing systems, and more particularly, to a landing point indication system.

BACKGROUND

An aircraft may operate in many different natural environments and thus subject its components to many different environmental stresses. One example of an aircraft is a rotorcraft. A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust in the same direction as the main rotor system's rotation to counter the torque effect created by the main rotor system.

SUMMARY

Particular embodiments of the present disclosure may provide one or more technical advantages. A technical advantage of one embodiment may include the capability to assist a pilot during takeoff and landing of an aircraft. A technical advantage of one embodiment may include the capability to improve the situational awareness of the environment below an aircraft during takeoff. A technical advantage of one embodiment may include the capability to increase the weight capacity of an aircraft.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION

Figure 1:
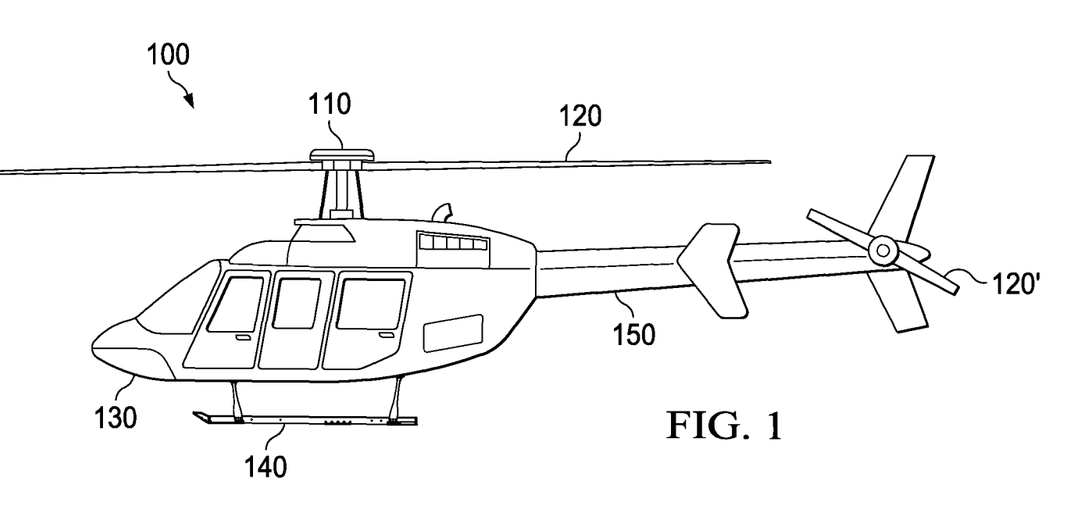
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft other than rotorcraft, such as airplanes and unmanned aircraft, to name a few examples.

Figure 2:
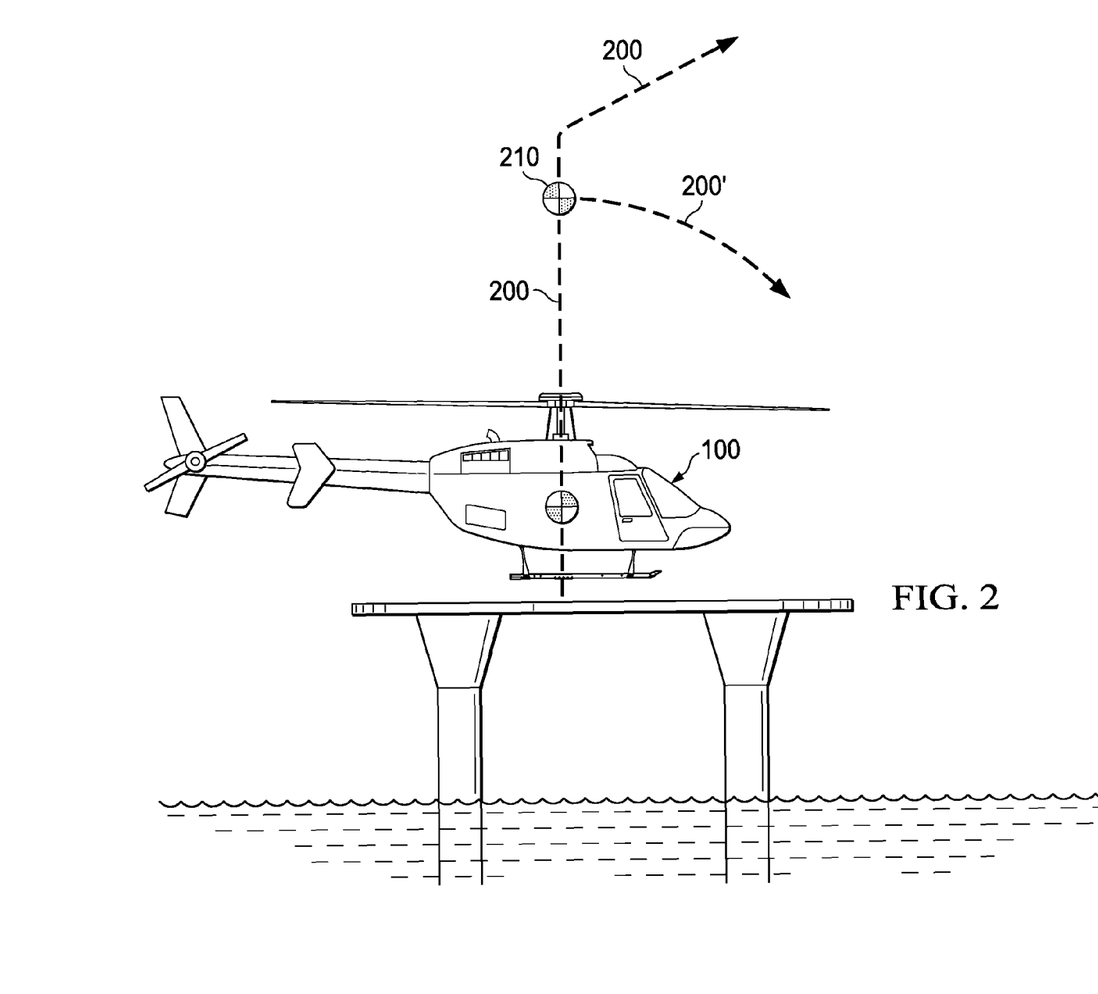
FIG. 2 shows the rotorcraft of FIG. 1 operating near a helipad in a marine environment.

Aircraft such as rotorcraft 100 may fly in a variety of environments. For example, FIG. 2 shows rotorcraft 100 operating near an elevated helipad in a marine environment. The operating environment of FIG. 2 may represent, for example, a helipad located on an off-shore oil platform. Although examples discussed herein may refer to the elevated helipad of FIG. 2, teachings of certain embodiments may apply to aircraft operations in a variety of environments.

In the example of FIG. 2, rotorcraft 100 is taking off from the helipad by traveling along a takeoff profile 200. According to takeoff profile 200, rotorcraft 100 begins the takeoff maneuver by climbing until a desired transition altitude above the helipad before beginning forward flight. Takeoff profile 200 may resemble one example of a takeoff profile of a twin-engine rotorcraft, although teachings of certain embodiments may apply to aircraft with more or fewer engines.

If rotorcraft 100 malfunctions during takeoff (e.g., a single engine failure), rotorcraft 100 may be forced to either return to the helipad or deviate from takeoff profile 200. For example, rotorcraft 100 may return to the helipad if rotorcraft 100 is still close to the helipad but may be forced to attempt a takeoff if rotorcraft 100 is too far away from the helipad.

Thus, there may exist a decision point 210 on takeoff profile 200 below which rotorcraft 100 should return to the helipad in the event of a malfunction and above which rotorcraft 100 should not return to the helipad in the event of a malfunction. The height of decision point 210 may be a function of a variety of factors. For example, decision point 210 may be limited to a height such that the occupants sustain no injury if rotorcraft 100 returns to the helipad from decision point 210. In this example, decision point 210 may be a function of criteria such as landing gear reserve energy.

As another example, decision point 210 may be a function of pilot situational awareness. For example, decision point 210 may be a function of how likely the pilot will be able to return to the landing point in the event of a rejected takeoff. In the example of FIG. 2, decision point 210 may be a function of the height at which the pilot can maintain visual contact with the surrounding environment such that the pilot can navigate rotorcraft 100 back to the helipad.

Pilot awareness of the location of rotorcraft 100 with respect to the environment directly below it during a vertical takeoff may be achieved in several ways. For example, if rotorcraft 100 is equipped with chin bubble windows, the pilot may have limited visibility through these windows. Chin bubble windows, however, can be partially obstructed by the pilot's legs and feet as well as the pedals or other structure. Furthermore, chin bubble windows do not provide visibility directly below the aircraft; rather, the field of view is down and forward. This field of view may not be particularly useful during a vertical takeoff from a helipad where the desired field of view is straight downward.

As another example, the pilot of rotorcraft 100 may gain situational awareness below the aircraft by looking out the side window. In this example, however, the pilot's field of view using this method is limited by the angle between the pilot's eye and the bottom of the side window. Using this method, the pilot may view other surrounding landmarks through the side window in an effort to maintain situational awareness of the surrounding environment. In the example of FIG. 2, however, the helipad is located in a marine environment without any surrounding landmarks available to the pilot.

Therefore, in the environment shown in FIG. 2, the height of decision point 210 may be limited by the pilot's ability to maintain visual contact with the helipad. If the height of decision point 210 is too low, however, then the height of decision point 210 may limit the takeoff gross weight of rotorcraft 100. In one example, the takeoff gross weight of rotorcraft 100 is a function of criteria such as aircraft performance, ambient conditions, and the height of decision point 210. In this example, the height of decision point 210 could limit how much payload rotorcraft 100 can carry when taking off from the helipad of FIG. 2.

Accordingly, as will be explained in greater detail below, teachings of certain embodiments recognize the capability to improve situational awareness of the environment below an aircraft during takeoff. In addition, teachings of certain embodiments recognize the capability to raise the decision point of an aircraft on takeoff and to increase the allowable takeoff gross weight of an aircraft upon takeoff.

Figure 3:
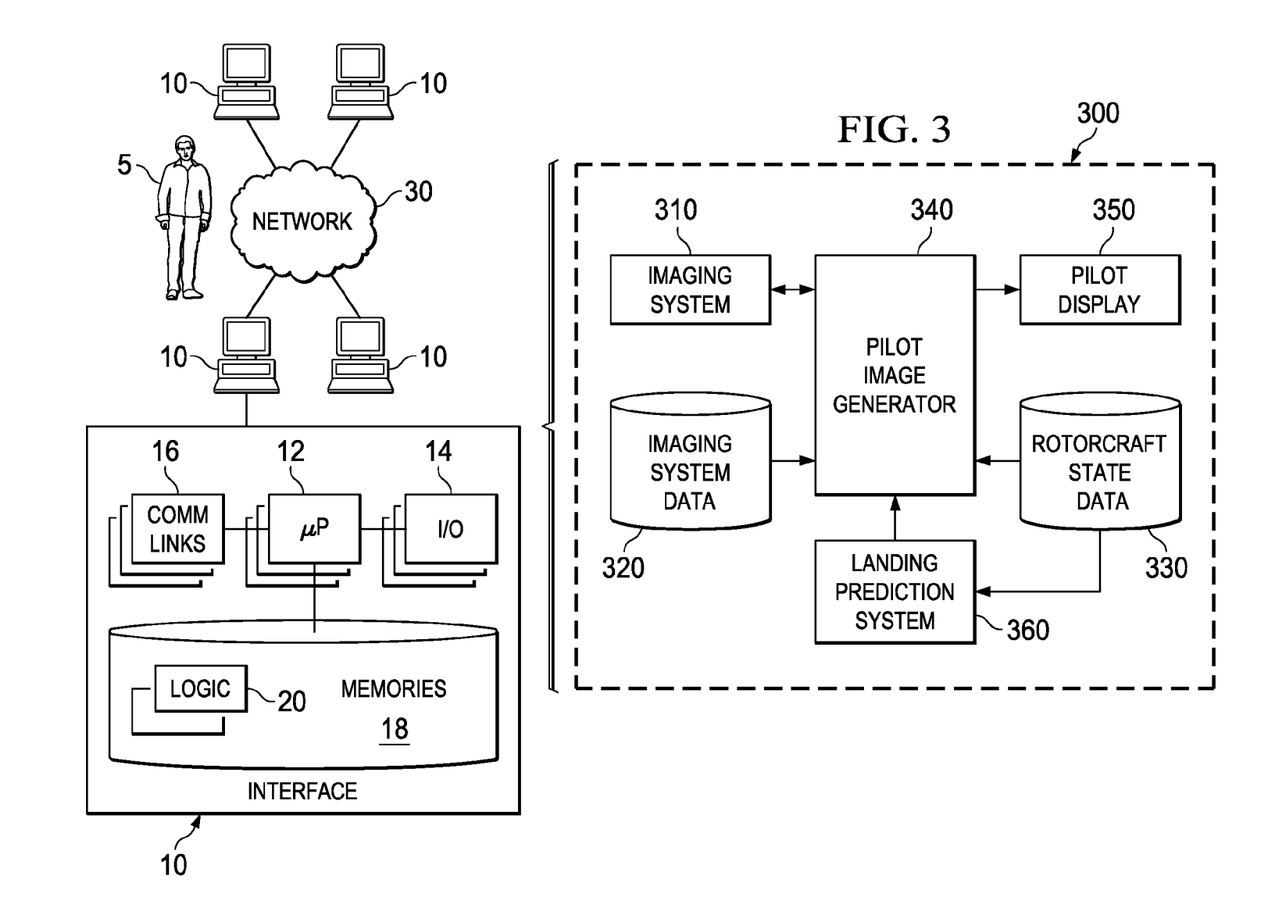
FIG. 3 shows a landing point indication system according to one example embodiment.

FIG. 3 shows a landing point indication system 300 according to one example embodiment. In general, system 300 features an imaging system 310, an imaging system data repository 320, a rotorcraft state data repository 330, a pilot image generator 340, a pilot display 350, and a landing indication system 360, that may be implemented by one or more computer systems 10.

All, some, or none of the components of system 300 may be located on or near rotorcraft 100 (or another aircraft). For example, in one example embodiment, imaging system 310 is at least partially located under rotorcraft 100, and pilot display 350 is located within the cockpit of rotorcraft 100.

Users 5 may access system 300 through computer systems 10. For example, in some embodiments, users 5 may interact with pilot display 350 through a computer system 10. Users 5 may include any individual, group of individuals, entity, machine, and/or mechanism that interacts with computer systems 10. Examples of users 5 include, but are not limited to, a pilot and a service person. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems.

In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Imaging system 310 provides a real-time visual representation of an area underneath rotorcraft 100. For example, imaging system 310 may show a helipad under rotorcraft 100 during takeoff and landing. In one example embodiment, imaging system 310 includes a camera mounted in a fixed position on rotorcraft 100 (e.g., mounted under rotorcraft 100 and facing downwards). Examples of a camera may include a visual-light camera and an infrared-light camera. In this example, the fixed camera may be dedicated to operation of system 300 or used for other purposes as well. For example, a fixed camera may assist the pilot in hoist or sling load monitoring.

In another example embodiment, imaging system 310 includes a gimbaled camera that may be aimed in a variety of directions (e.g., mounted under rotorcraft 100 and aimed at a direction to be determined by pilot image generator 340). In this example, the gimbaled camera may be dedicated to operation of system 300 or used for other purposes as well. For example, a gimbaled camera may assist the pilot in locating personnel and/or objects outside the aircraft (e.g., on the ground or water). In some embodiments, the gimbaled camera is stabilized such that it is movable in one or more directions upon request but is otherwise restricted from moving (e.g., restricted from moving in response to vibrations or environmental forces).

In yet another example embodiment, imaging system 310 includes a synthetic imaging system that provides a computer-generated representation of an area under rotorcraft 100. For example, imaging system 310 may use information identifying the location of rotorcraft 100 to render an image based on terrain and structure information stored in a database.

Imaging system data repository 320 stores information about imaging system 310. As one example, imaging system data repository 320 may store information identifying how a fixed camera is mounted to rotorcraft 100 (e.g., position on rotorcraft 100 and camera boresight angle). As yet another example, imaging system data repository 320 may store information identifying a current status of imaging system 310 (e.g., current zoom and boresight angle of a gimbaled camera).

Rotorcraft state data repository 330 provides information about the state of rotorcraft 100. For example, rotorcraft state data repository 330 may provide location and orientation information (e.g., latitude, longitude, radar altitude, pressure altitude, pitch attitude, roll attitude), movement information (e.g., angular and linear velocities and accelerations), flight characteristic information (e.g., information about how the aircraft operates during flight), environment information (such as information about the environment in which the aircraft is operating), and other information describing the aircraft (e.g., weight on wheels).

Pilot image generator 340 generates an image to be displayed on pilot display 350. Pilot display 350 may represent a display system installed in the cockpit of rotorcraft 100. In some embodiments, the pilot display 350 may be integrated into the pilot's hover display such that the pilot will not have to remove focus from the primary displays to achieve downward visibility. In this example, pilot display 350 may represent an inset display within a second display device. In another example embodiment, display 350 may be an independent display device (e.g., not sharing a display screen with other instrumentation information). In yet other example embodiments, display 350 may represent a heads-up display device or a helmet-mounted display device. In these examples, display 350 may present a real-time visual representation of an area underneath rotorcraft 100 without requiring the pilot to look away from the pilot's usual viewpoints.

In some embodiments, pilot image generator 340 receives the visual representation of the area underneath rotorcraft 100 and supplements the visual representation with information indicating a state of the rotorcraft (e.g., position and velocity of the rotorcraft). For example, if imaging system 310 includes a camera mounted in a fixed position on rotorcraft 100, pilot image generator 340 may calculate where on the image over which the helicopter is positioned and overlay a symbol indicating a position of the rotorcraft (e.g., a crosshairs or a shadow of a rotorcraft). In some embodiments, the symbol may also indicate the heading of the rotorcraft (e.g., an artificial shadow of the rotorcraft in which the nose of the shadow is substantially aligned with the nose of the rotorcraft). In some embodiments, the size of the symbol may indicate a distance of the rotorcraft above the landing surface under the rotorcraft.

Pilot image generator 340 may perform this calculation, for example, based on the imaging system data provided by imaging system data repository 320 and the rotorcraft state data provided by rotorcraft state data repository 330. For example, pilot image generator 340 may compute the offset (e.g., in pixels) from the center of the image received imaging system 310 to the location in the image that represents the location directly under the rotorcraft. In this example, the location may be based on camera boresight and lever arm corrections, pitch and roll attitude, and height above the takeoff surface based on radar altitude or increase in pressure altitude from takeoff. The ability to account for these and other characteristics of rotorcraft 100 may allow for a more useful image as compared to a simple camera feed. For example, if a simple camera feed does not account for pitch and roll attitude, then the image may change when the pilot pitches or rolls the rotorcraft.

In another example, if imaging system 310 includes a gimbaled camera, pilot image generator 340 may instruct the imaging system 310 to position the camera such that the rotorcraft is over the center of the image (or over another predetermined point in the image). In this example, pilot image generator 340 may overlay a symbol indicating a position of the rotorcraft at the center of the image (or at another predetermined point in the image). In some embodiments, pilot image generator 340 may crop the image provided by imaging system 310 such that the aircraft appears in the proper location in the display.

In yet another example, pilot image generator 340 receives a computer-generated representation of the area underneath rotorcraft 100 from a synthetic image generator and supplements the computer-generated representation with information indicating a position of the rotorcraft. In this example, pilot image generator 340 may calculate where on the computer-generated image over which the helicopter is positioned and overlay a symbol indicating a position of the rotorcraft.

In some embodiments, system 300 also includes a landing prediction system 360. Landing prediction system 360 may predict where rotorcraft 100 would land based on state information provided by repository 330 (e.g., based on aircraft rates and attitudes). This may be analogous to high speed/low altitude attack planes, which may use a flight path vector on the pilot's helmet mounted display to show the aircraft's flight path based on its current state. For example, a pilot may look ahead when approaching a ridgeline and determine if the aircraft's flight path is going to clear the ridge or not. If not, as soon as an appropriate aft stick input is made the flight path vector may move up to indicate that the new flight state will allow the aircraft to pass safely above the ridgeline.

In some embodiments, pilot image generator 340 may overlay a symbol indicative of a predicted landing point based on information from landing prediction system 360. Teachings of certain embodiments recognize that indicating a predicted landing point may let the pilot confirm that the aircraft is on a landing trajectory on the center of the helipad or to offer guidance to make a course correction. The flight path vector could also be superimposed on any forward looking infrared radiometer (FLIR) or night vision goggle (NVG) sensor presentation that might be used to complete a normal approach to landing.

In some embodiments, pilot image generator 340 may overlay symbols indicative of both the predicted landing point of the rotorcraft and of a target point for the rotorcraft (e.g., the center of the helipad). In this example, display 350 may also indicate the desired velocity or other information that may be used to correct the position.

Although some embodiments described herein refer to takeoff and landing of a rotorcraft, teachings of certain embodiments may apply to any vehicle application where the location of the aircraft with respect to the terrain below would enhance situational awareness and safety. This technology may be beneficial, for example, to aircraft operating in visual meteorological conditions (VMC) conditions in a hover or low speed flight in any direction. The position of the aircraft with respect to the environment directly below it may be particularly important for dynamic vertical takeoffs from offshore oil rigs (such as shown in FIG. 2) when the rig is the only visual cue the pilot can use to judge position. Knowing vehicle position with respect to the rig in the initial part of the takeoff maneuver may be critical for pilot awareness and flight safety.

Figure 4A:
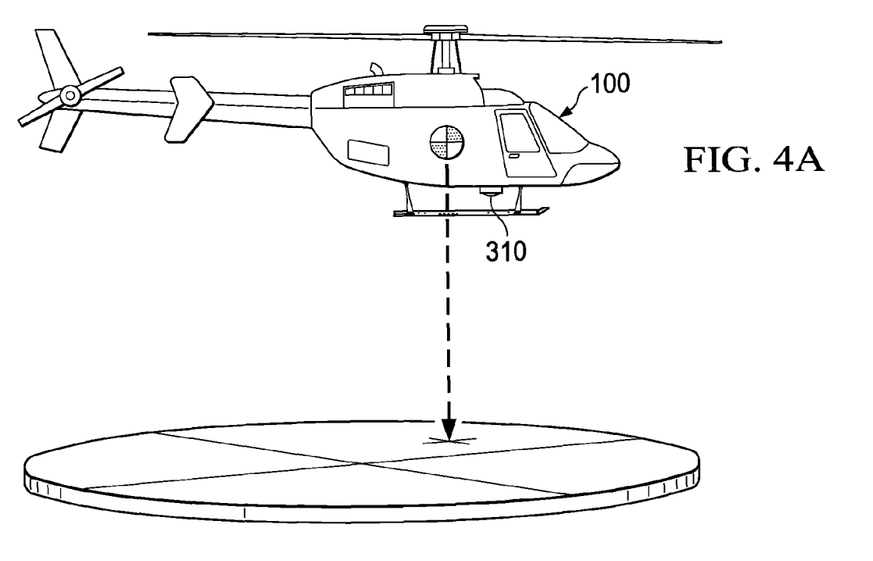
FIG. 4A shows the rotorcraft of FIG. 1 equipped with the landing point indication system of FIG. 3 having a fixed camera during operation near the helipad shown in FIG. 2 according to one example embodiment.
Figure 4B:
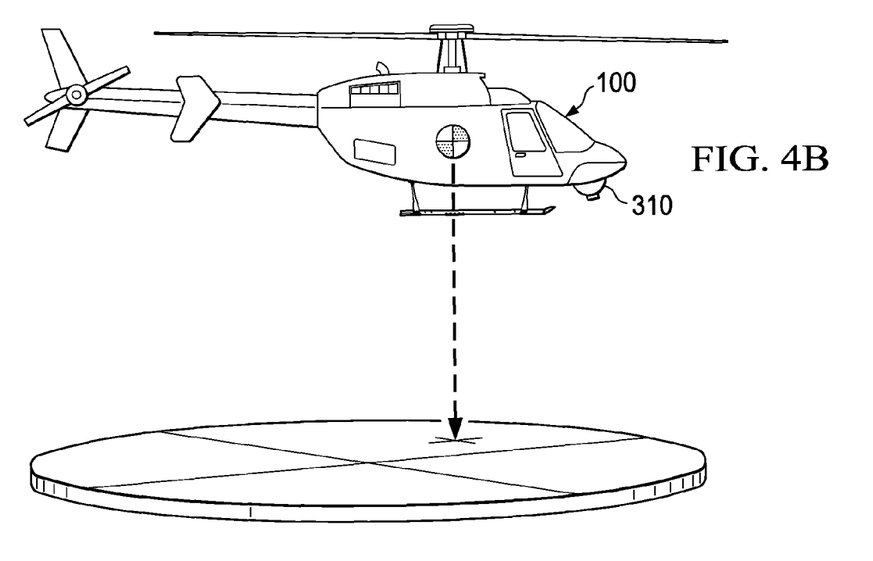
FIG. 4B shows the rotorcraft of FIG. 1 equipped with the landing point indication system of FIG. 3 having a gimbaled camera during operation near the helipad shown in FIG. 2 according to one example embodiment.

FIGS. 4A and 4B show rotorcraft 100 of FIG. 1 equipped with landing point indication system 300 of FIG. 3 during operation near the helipad shown in FIG. 2 according to example embodiments.

In FIG. 4A, rotorcraft 100 is equipped with a fixed camera associated with the imaging system 310 of system 300. In this example, the fixed camera is installed on the belly of rotorcraft 100, and the field of regard of the camera is therefore fixed to the location and orientation of rotorcraft 100. Thus, the location directly below rotorcraft 100 moves in the field of regard of the camera both as the aircraft translates (body X/Y/Z axes) and rotates (body pitch/roll). This location may be indicated in the field of regard in a variety of ways, such as by overlying crosshairs or a virtual helicopter shadow. In some embodiments, this location may also be indicated by displaying the camera image as an underlay to a hover display or a horizontal situation indicator. The image may be cropped such that the location directly under rotorcraft 100 appears in the proper location in the display.

In FIG. 4B, rotorcraft 100 is equipped with a gimbaled camera associated with the imaging system 310 of system 300. In this example, the gimbaled camera is installed near the nose of rotorcraft 100. The center of the field of regard of the camera is steered to indicate the point directly below rotorcraft 100. This camera may be dedicated to this purpose or could be used for other purposes (e.g., search and rescue).

Figure 5A:
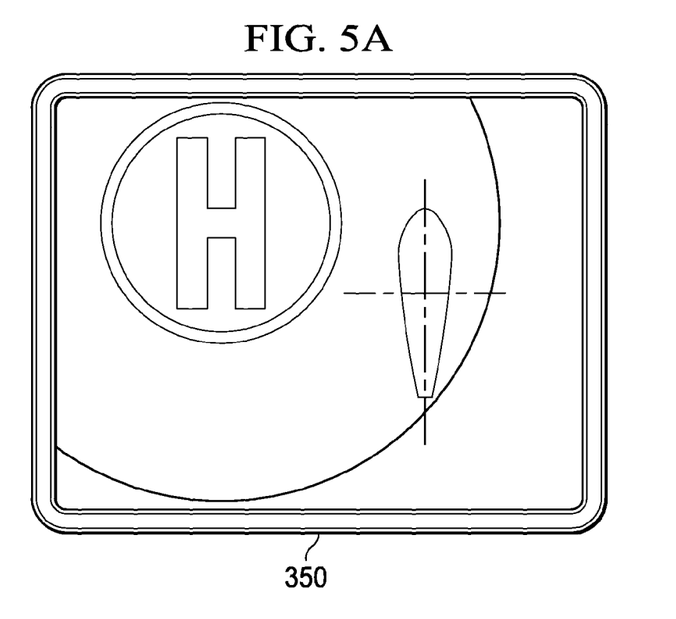
FIGS. 5A and 5B show example pilot images shown by the display 350 of the landing point indication system of FIG. 3 using the fixed camera configuration shown in FIG. 4A according to example embodiments.
Figure 5B:
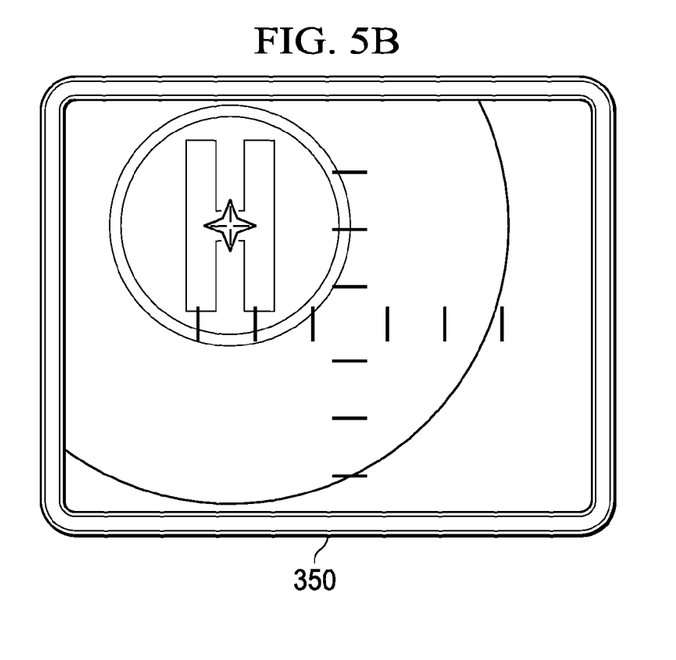

FIGS. 5A and 5B show example pilot images shown by display 350 using the fixed camera configuration shown in FIG. 4A according to example embodiments. In FIG. 5A, display 350 renders a supplemented visual representation of the environment under rotorcraft 100 using images from the fixed camera of FIG. 4A. As seen in FIG. 5A, symbology is overlaid on a point corresponding to the location below rotorcraft 100. This symbology is offset from the center of the image due to the attitude of rotorcraft 100 during flight. In this example, pilot image generator 340 receives imaging system data from repository 320 (such as the fixed camera boresight angles and the camera level arm data) as well as rotorcraft data from repository 330 (such as pitch attitude, roll attitude, pressure altitude, radar altitude, and weight on wheels). Next, pilot image generator 340 may compute the offset, in pixels, from the center of the image to the location in the image that represents the location directly under the helicopter based on the received data. Pilot image generator 340 may then overlay the representative symbology (e.g., shadow or crosshairs) on the image from the fixed camera based on the computed offset from center.

In FIG. 5B, display 350 renders a supplemented visual representation of the environment under rotorcraft 100 using images from the fixed camera of FIG. 4A. As seen in FIG. 5B, symbology is overlaid on a point corresponding to the location below rotorcraft 100. This symbology, shown in FIG. 5B as crosshair lines, indicates that rotorcraft 100 is located over the center of the image. Also shown in FIG. 5B is a star representative of a target location for rotorcraft 100 (in this example, located at the center of the helipad).

In this example, pilot image generator 340 receives imaging system data from repository 320 (such as the fixed camera boresight angles and the camera level arm data) as well as rotorcraft data from repository 330 (such as pitch attitude, roll attitude, pressure altitude, radar altitude, and weight on wheels). Next, pilot image generator 340 may compute the offset, in pixels, from the center of the image to the location in the image that represents the location directly under the helicopter based on the received data. Unlike the example from FIG. 5A, however, pilot image generator 340 positions the location of rotorcraft 100 in the center of the image by cropping the image from the fixed camera such that the pixel corresponding to the location directly under rotorcraft 100 is located in the center of the image.

Modifications, additions, or omissions may be made to the systems and apparatuses described herein without departing from the scope of the invention. The components of the systems and apparatuses may be integrated or separated. More-over, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
   a body;
   a power train coupled to the body and comprising a power source and a drive shaft coupled to the power source;
   a hub;
   a rotor blade coupled to the hub; and
   a landing point indication system comprising:
      an image provider operable to provide an uninterrupted real-time visual representation of an area underneath the rotorcraft;
      a rotorcraft state provider operable to provide information indicating a position of the rotorcraft and an attitude of the rotorcraft;
      a pilot image generation system operable to generate a supplemented visual representation based on the provided position of the rotorcraft and the provided attitude of the rotorcraft, the supplemented visual representation comprising the uninterrupted real-time visual representation of the area underneath the rotorcraft and information indicating a position of the rotorcraft relative to the uninterrupted real-time visual representation; and
      a display device installed within the body and operable to display the supplemented visual representation.

2. The rotorcraft of claim 1, wherein the image provider comprises a camera coupled to the body.

3. The rotorcraft of claim 2, wherein the camera is mounted in a fixed position to the body.

4. The rotorcraft of claim 2, wherein the camera is adjustably mounted to the body.

5. The rotorcraft of claim 1, wherein the image provider comprises a synthetic imaging system operable to provide a computer-generated representation of an area under the rotorcraft.

6. The rotorcraft of claim 1, wherein the pilot image generation system is operable to generate the supplemented visual representation by:
   determining a position within the visual representation of the area underneath the rotorcraft indicative of the position of the rotorcraft; and
   overlaying a visual representation of the rotorcraft on the visual representation at the determined position.

7. The rotorcraft of claim 1, wherein the pilot image generation system is operable to generate the supplemented visual representation by instructing a camera associated with the image provider to aim at an orientation below the rotorcraft such that the rotorcraft is positioned over a predetermined position within the visual representation.

8. The rotorcraft of claim 1, wherein the pilot image generation system is further operable to generate the supplemented visual representation by overlaying a representation of a predicted landing position based on flight characteristics of the rotorcraft.

9. The rotorcraft of claim 1, wherein the information indicating a position of the rotorcraft is selected from the group consisting of latitude, longitude, radar altitude, pressure altitude, and weight on wheels of the rotorcraft.

10. The rotorcraft of claim 1, wherein the display device is selected from the group consisting of an independent display device, an inset display within a second display device, a heads-up display device, and a helmet-mounted display device.

11. A landing point indication system comprising:
   an image provider operable to provide an uninterrupted real-time visual representation of an area underneath a rotorcraft;
   a rotorcraft state provider operable to provide information indicating a position of the rotorcraft and an attitude of the rotorcraft;
   a pilot image generation system operable to generate a supplemented visual representation based on the provided position of the rotorcraft and the provided attitude of the rotorcraft, the supplemented visual representation comprising the uninterrupted real-time visual representation of the area underneath the rotorcraft and information indicating a position of the rotorcraft relative to the uninterrupted real-time visual representation; and
   a display device operable to display the supplemented visual representation within the rotorcraft.

12. The landing point indication system of claim 11, wherein the pilot image generation system is operable to generate the supplemented visual representation by:
   determining a position within the visual representation of the area underneath the rotorcraft indicative of the position of the rotorcraft; and
   overlaying a visual representation of the rotorcraft on the visual representation at the determined position.

13. The landing point indication system of claim 11, wherein the pilot image generation system is operable to generate the supplemented visual representation by instructing a camera associated with the image provider to aim at an orientation below the rotorcraft such that the rotorcraft is positioned over a predetermined position within the visual representation.

14. The landing point indication system of claim 11, wherein the pilot image generation system is further operable to generate the supplemented visual representation by overlaying a representation of a predicted landing position based on state information associated with the rotorcraft.

15. A method of assisting a pilot during operation of a rotorcraft, comprising:
   receiving an uninterrupted real-time visual representation of an area underneath a rotorcraft;
   receiving information indicating a position of the rotorcraft and an attitude of the rotorcraft;
   generating a supplemented visual representation based on the provided position of the rotorcraft and the provided attitude of the rotorcraft, the supplemented visual representation comprising the uninterrupted real-time visual representation of the area underneath the rotorcraft and information indicating a position of the rotorcraft relative to the uninterrupted real-time visual representation; and
   displaying the supplemented visual representation within the rotorcraft.

16. The method of claim 15, wherein the visual representation is received from a camera mounted to the rotorcraft.

17. The method of claim 15, wherein the visual representation is received from a synthetic imaging system operable to provide a computer-generated representation of an area under the rotorcraft.

18. The method of claim 15, wherein generating the supplemented visual representation comprises:
   determining a position within the visual representation of the area underneath the rotorcraft indicative of the position of the rotorcraft; and
   overlaying a visual representation of the rotorcraft on the visual representation at the determined position.

19. The rotorcraft of claim 1, wherein the attitude of the rotorcraft comprises a pitch attitude of the rotorcraft.

20. The rotorcraft of claim 1, wherein the attitude of the rotorcraft comprises a roll attitude of the rotorcraft.

* * * * *